No. 820,973. PATENTED MAY 22, 1906.
C. N. HAZELTON.
FOLDING SEAT AND STEP.
APPLICATION FILED APR. 7, 1905.

2 SHEETS—SHEET 1.

Witnesses
H. H. Hunt.
Carrie T. Haskell.

Inventor
Charles N. Hazelton,
By Walter N. Haskell,
Attorney

No. 820,973. PATENTED MAY 22, 1906.
C. N. HAZELTON.
FOLDING SEAT AND STEP.
APPLICATION FILED APR. 7, 1905.

2 SHEETS—SHEET 2.

Witnesses
H. H. Hunt,
Carrie I. Haskell.

Inventor
Charles N. Hazelton.
By Walter N. Haskell,
Attorney

UNITED STATES PATENT OFFICE.

CHARLES N. HAZELTON, OF MORRISON, ILLINOIS.

FOLDING SEAT AND STEP.

No. 820,973.   Specification of Letters Patent.   Patented May 22, 1906.

Application filed April 7, 1905. Serial No. 254,318.

*To all whom it may concern:*

Be it known that I, CHARLES N. HAZELTON, a citizen of the United States, residing at Morrison, in the county of Whiteside and State of Illinois, have invented certain new and useful Improvements in a Folding Seat and Step; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has reference to combined folding seats and steps, and pertains to certain novel improvements on a similar device upon which Letters Patent of the United States No. 782,393 were issued to me February 14, 1905.

Figure 1:
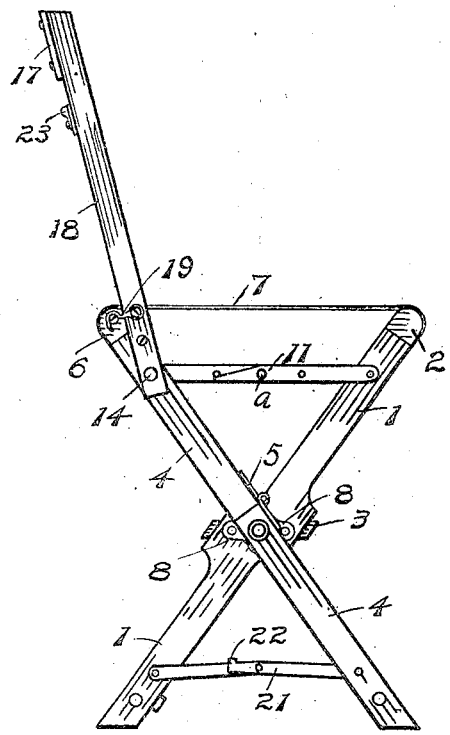
Figure 2:
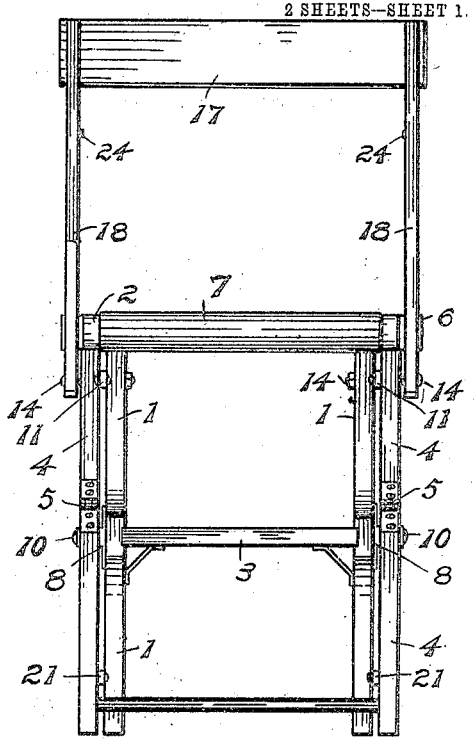
Figure 3:
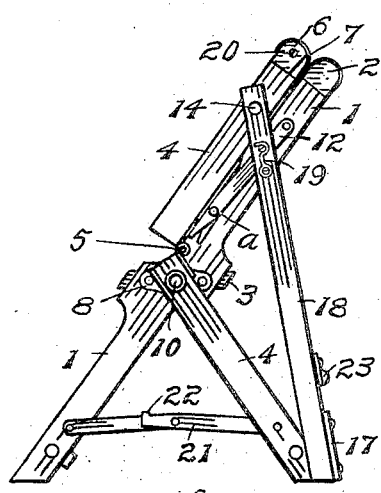
Figure 4:
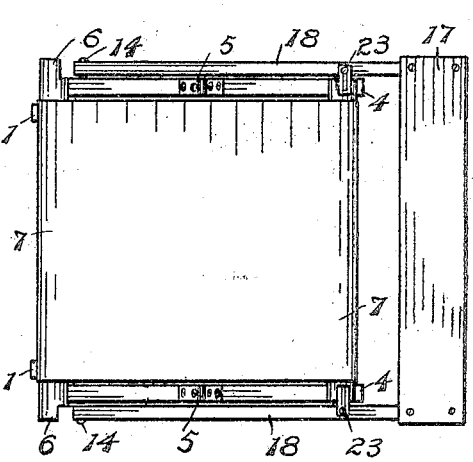
Figure 5:
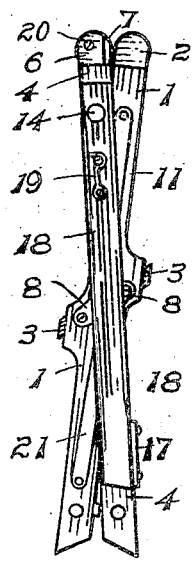
Figures 6, 7:
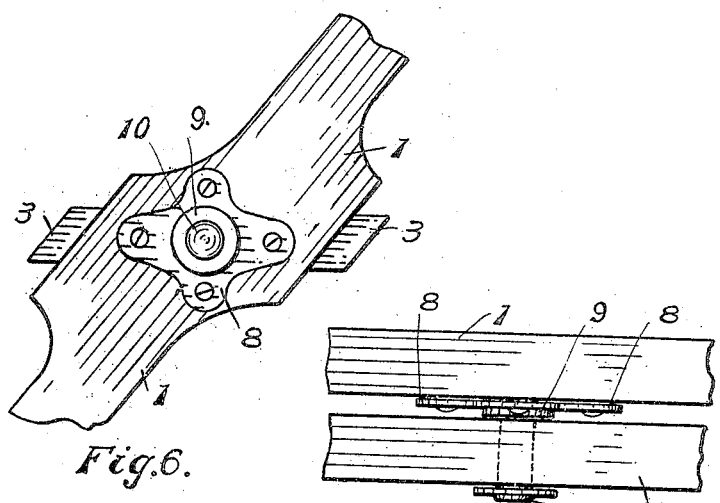
Figure 8:
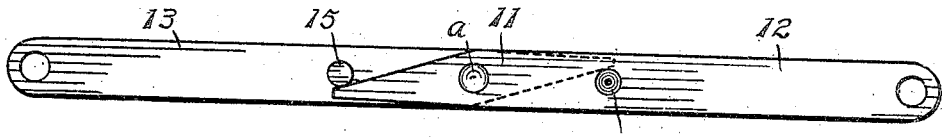
Figure 9:
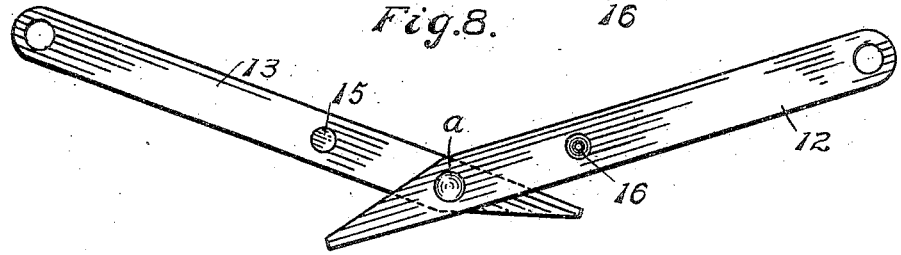
Figure 11:
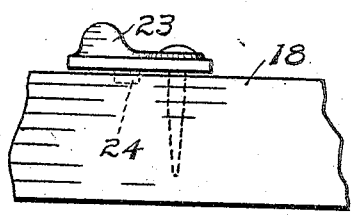
Figure 10:
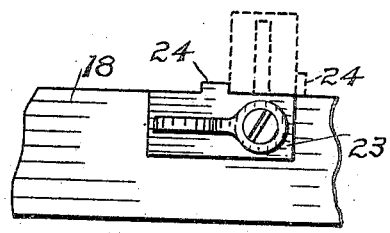

In the drawings, Figure 1 is a side elevation of the device in position to be used as a seat. Fig. 2 is a front elevation thereof. Fig. 3 is a side elevation of my invention when used as a step. Fig. 4 is a plan view thereof when used as a support. Fig. 5 is a side elevation of the device when folded for transportation or storage. Fig. 6 is a detail illustrating the plate 8. Fig. 7 shows the method of pivoting the leg 4 to the leg 1. Figs. 8 and 9 show the brace 11, in enlarged detail, in two positions. Figs. 10 and 11 are enlarged details illustrating the button 23 in plan and side views, respectively.

Similar numbers refer to similar parts throughout the several figures.

1 1 represent an inner pair of legs united at their upper ends by a cross-piece 2 and having the step 3 fixed to the inner faces of such legs at a central point thereof. A pair of outer legs 4 is pivotally secured to the legs 1 in the usual sawbuck style, such legs being bisected slightly above the pivotal point and provided with hinges 5, permitting the upper portions of such legs to be folded over into proximity with the legs 1, as shown in Fig. 3. Fixed to the upper ends of the legs 4 is a cross-piece 6, and a flexible seat 7 is secured on the cross-pieces 2 and 6 in the usual manner.

It is necessary to provide a space between each pair of legs 1 and 4, and this may be accomplished at the pivotal point thereof in the following manner: Fixed to the outer face of each of the legs 1 is a metal plate 8, having an annular raised portion 9 and a pin 10, integral with the plate 8 and adapted to pass through a perforation in the leg 4 and be suitably secured on the outer face thereof. The legs are thus separated by the thickness of the plate 8 and raised portion 9 thereon. The plate 8 is preferably attached to the leg 1 by means of screws passing through holes in the extremities of such plate; two of such holes being in line with the end of the step 3, the screws passing through the leg into such step, assisting in holding the same in place.

The upper parts of each pair of legs 1 and 4 are normally separated, so as to maintain the seat 7 in a taut condition by means of a pair of metal braces 11. Each of these braces is formed of two plates 12 and 13, pivotally united, as at *a*, the outer end of the plate 12 being pivotally secured to the outer face of the leg 1 and the outer end of the plate 13 being similarly attached to the inner face of the leg 4 by a bolt or rivet 14. Each of the parts 12 and 13 is provided with a tapering inner end projecting beyond the pivotal point, such end of the plate 12 coming in contact with a stud 15 on the plate 13, limiting the upward movement of the brace. The inner end of the plate 13 passes over a boss 16, formed in the inner face of the plate 12, by forcing a small portion of such plate inwardly. As the brace is opened the end of the plate 13 passes over the boss 16 until when the end of the plate 12 comes into contact with the stud 15 the end of the other plate is in engagement with the upper edge of the boss 16, the brace being thereby locked from accidental closing.

On account of the upper parts of one pair of legs being hingeably attached to the lower parts thereof it is desirable to have the braces connecting such hinged portions with the other pair of legs secured at both of their ends, thereby preventing movement of said hinged portions in either direction when the seat is open for use. If such braces are attached to the legs at one end only, the hinged portions are liable to be forced outwardly too far in opening the seat, resulting in the springing of the hinges thereof. By attaching the braces at both ends a more rigid support is secured and the seat given a uniform degree of tautness.

When it is desired to use the step 3, the braces 11 are forced downwardly at their central points, the end of the plate 13 again passing over the boss 16, such braces being thereby doubled or folded downwardly, permitting the upper parts of the legs 4 to be folded over into proximity with the legs 1, as shown in Fig. 3. The space between the legs 1 and 4, already referred to, is of sufficient width to permit the brace 11 to fold therein.

A folding back for the seat is provided by a cross-piece 17, secured to a pair of supports 18, pivoted on the outside of the legs 4 on the bolts 14. The cross-piece 6 is projected at each end to furnish support for the parts 18, and accidental folding of the back is provided against by means of a hook 19, pivoted on the outer face of the support 18 and adapted to engage a pin 20 in the end of the cross-piece 6. Both of the supports 18 may be provided with such fastening means, if desired.

When the device is used as a step, the back is unhooked and turned downwardly, the ends of the supports 18 coming in contact with the ground and furnishing an additional support for the device to prevent the same from tipping backwardly. This feature will permit the use of the cross-pieces 2 and 6 when in proximity, as in Fig. 3, as an additional rest for the feet or second step, enabling the operator to secure objects ordinarily out of reach.

The lower ends of each contiguous pair of legs 1 and 4 are held from separation beyond a desired point by a folding brace 21, pivoted in the center and pivotally secured at its ends to the legs 1 and 4, so as to fold upwardly into the space between such legs when the seat is closed, as shown in Fig. 5. One of the parts of such brace projects beyond the pivotal point and is provided with a lip 22, which comes in contact with the upper edge of the other part of the brace and limits the downward movement thereof. For the purpose of strengthening the brace against lateral movement at its pivotal point the inner ends of both parts of the brace may be projected beyond the pivotal point, if desired. When the brace is fully open, the parts thereof incline upwardly toward the center, so that the brace will fold automatically upon the closing of the lower parts of the legs 1 and 4.

On the rear side of each of the supports 18 is pivoted a button 23, which when turned inwardly comes in contact with the ends of the cross-piece 2 as the back is lowered and supports the same thereon, as shown in Fig. 4. In this position the device can be utilized for the support of an atlas or any broad book or object. The button 23 is provided with a lug 24, which comes in contact with the edge of the support when the button is turned at a right angle thereto and prevents the button being moved beyond such an angle. (Shown in dotted lines.) As the button is returned to its former position the lug 24 again comes in contact with the support and limits the movement of the button outwardly.

As shown in Fig. 5, for purposes of transportation or when not in use the parts can be folded into compact space, the supports of the back folding downwardly in line with and adjacent to the legs 4.

What I claim as my invention, and desire to secure by Letters Patent of the United States, is—

1. In a combined folding seat and step, the combination of an inner pair of legs; a step rigidly uniting such legs at their central points; an outer pair of legs, spaced apart from said inner pair, and pivotally secured thereto at their central points, the upper parts of said outer pair of legs being hingeably secured to the lower parts, above the pivotal points thereof, so as to fold over into proximity with the inner pair of legs; means for holding the upper parts of each adjacent pair of legs from accidental closing; means for limiting the separation of the lower parts of said legs, when in use; and a folding back, pivotally secured to the outer pair of said legs, and adapted to fold downwardly to form a support, when said device is in use as a step, substantially as shown and set forth.

2. The combination, with a pair of spaced-apart legs 1 and 4, pivotally attached at their central points, of a brace 11, pivotally secured at each of its ends to one of said legs, and comprising two plates 12 and 13, pivotally united centrally of said brace, so as to fold downwardly into the space between said legs; the inner ends of said plates being projected beyond the pivotal point, the inner end of the plate 12 coming in contact with a stud 15 fixed on the plate 13, and the inner end of the plate 13 engaging a boss 16 on the plate 12, so as to lock said brace from accidental closing, substantially as shown and described.

3. In a folding seat and step, the combination of a pair of legs 1, provided with the cross-piece 2; the pair of legs 4, pivotally attached to the legs 1 at their central points, and provided with the cross-piece 6; a pair of supports 18, pivoted on the legs 4, and united by the back 17; and the buttons 23, pivoted on the strips 18, and adapted to be turned inwardly into engagement with the ends of the cross-piece 2, to support the back thereon, substantially as and for the purpose named.

In testimony whereof I affix my signature in presence of two witnesses.

CHARLES N. HAZELTON.

Witnesses:
  Q. L. WEAVER,
  C. H. WOODBURN.